P. H. Taylor,
Check.

No. 100,467.  Patented Mar. 1, 1870.

Witnesses:
H. N. Jenkins
Rufus R. Rhodes

Inventor:
P. H. Taylor

United States Patent Office.

PATRICK HENRY TAYLOR, OF NEW ORLEANS, LOUISIANA.

Letters Patent No. 100,467, dated March 1, 1870.

IMPROVEMENT IN LABELS FOR COTTON-BALES.

The Schedule referred to in these Letters Patent and making part of the same.

I, PATRICK HENRY TAYLOR, of the city of New Orleans, in the State of Louisiana, have invented a certain Improved Cotton-Check for Marking Cotton-Bales, but which is also applicable to bales of merchandise of every description, of which the following is a specification.

Nature and Objects of the Invention.

My invention relates to a method of marking banded bales, whether of cotton or other substance, by means of what is technically known as a "marking-check," which said check is so contrived as to be readily and quickly secured on any one or more of the bands of the bale, and is just as readily removed, but in the latter case not without defacing the rivet which holds the device on the band or the mark on said rivet, if there be a mark on it, which will at once disclose the fact that a removal has been made.

The object of my improvement is to provide a means for marking cotton-bales, or bales of merchandise of any description, of such a nature that it may be readily attached to the bale after it leaves the press, and which will be secure against accidental or fraudulent removal without presenting evidence of the fact, and thereby prevent an exchange of bales by a change of the marks thereupon.

To effect this object I construct a tag of sheet metal or other suitable material, which is folded over one of the bands of the bale, and is secured on it by means of a rivet of lead or other suitable material, which is passed through perforations in the ends of the tag, and is upset by pressure or percussion, so as to provide a flat head thereupon, on which, if desired, an impression or seal may at the same time be made that may be the trade-mark of the proprietor.

The rivet may be readily punched or otherwise forced out and the check removed, but in the operation the seal impressed upon it must necessarily be defaced or destroyed, so that it cannot be used again, while the check proper remains uninjured, and may consequently be used again for an indefinite number of times. Hence it will be observed that my improvement presents a means which effectually prevents the fraudulent substitution of one bale for another, by a change of the marks thereupon, without instant detection, while at the same time it is so contrived that it may be easily and quickly removed by authorized persons, without injury to any part of it except the rivet, and may consequently, by means of new rivets, be used over and over again on new bales for an indefinite period of time.

The rivet may be securely attached to one end of the plate of metal of which the check is chiefly composed, by soldering, or it may be kept detached from said plate until the two are to be connected in actual practice on a bale of cotton or merchandise, as the case may be, accordingly as convenience may require.

Description of the Accompanying Drawing.

A is a plate or thin sheet of any proper material, which is provided with a hole, B, at each of its extremities, to receive a rivet, C, as before stated, of soft or yielding metal, so as to be readily impressed with any proper tool or implement with a seal, which may be composed of letters or signs, or both, or a trade-mark, or any other design which fancy or convenience may dictate or suggest.

Figure 1:
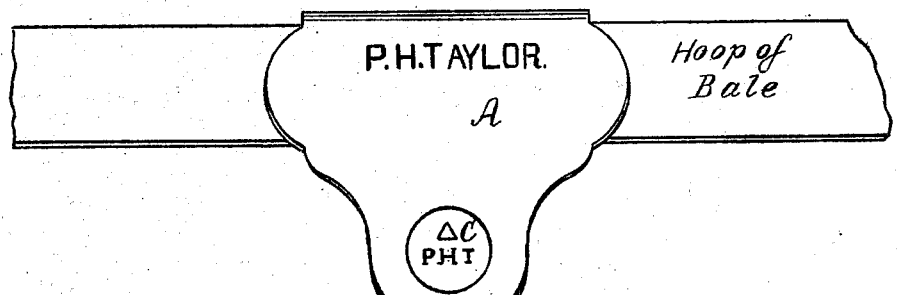
Figure 1 represents my invention as when fixed on a band, which we may suppose to be on a bale, to mark the latter.
Figure 2:
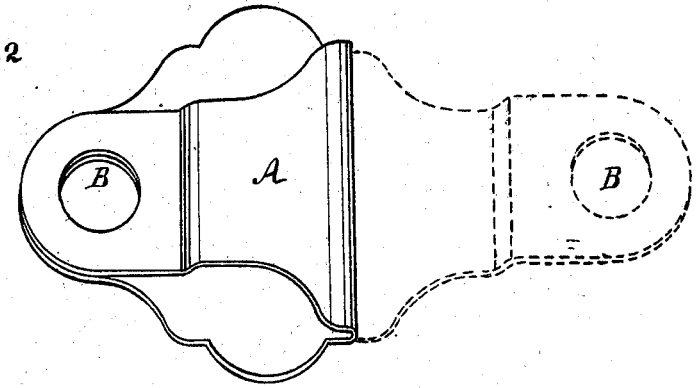
Figure 2 represents it as when folded over for the insertion of the rivet; and, by means of the dotted lines, before this operation.
Figure 3:
Figure 3 is a detached view of a proper rivet.

The drawing is merely illustrative of my invention, for it need hardly be remarked that the form of the plate A may be varied indefinitely, the only two conditions which are absolutely necessary with respect to its construction being that it shall be wide enough to allow of a name being put on it, as shown at fig. 1, which name we may suppose to be that of the owner or shipper of the bale to which the device is secured, and long enough to permit the holes B to come into conjunction with each other, when the plate has been folded over a band sufficiently beyond the proximate edge of the same to secure the easy introduction of the rivet C therein.

The shank of the rivet should always be long enough to secure the formation of a head by the upsetting of the same, to hold it in place until by the application of force it is driven out.

I claim as my invention—

The plate A, in combination with a rivet, C, when these two parts are constructed and united as herein described, for the purpose set forth.

P. H. TAYLOR.

Witnesses:
   H. N. JENKINS,
   RUFUS R. RHODES.